(12) United States Patent
Wei et al.

(10) Patent No.: US 12,081,470 B2
(45) Date of Patent: Sep. 3, 2024

(54) D2D COMMUNICATION CONTROL METHOD AND CONTROL APPARATUS

(71) Applicant: Beijing Zhigu Rui Tuo Tech Co., Ltd, Beijing (CN)

(72) Inventors: Na Wei, Beijing (CN); Weicai Huang, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 611 days.

(21) Appl. No.: 17/233,705

(22) Filed: Apr. 19, 2021

(65) Prior Publication Data

US 2021/0242992 A1 Aug. 5, 2021

Related U.S. Application Data

(62) Division of application No. 15/166,240, filed on May 26, 2016, now Pat. No. 11,012,205.

(30) Foreign Application Priority Data

May 29, 2015 (CN) .......................... 201510289747.8

(51) Int. Cl.
| | | |
|---|---|---|
| *H04L 5/00* | (2006.01) | |
| *H04W 16/28* | (2009.01) | |
| *H04W 72/51* | (2023.01) | |
| *H04W 76/14* | (2018.01) | |

(52) U.S. Cl.
CPC .......... *H04L 5/0048* (2013.01); *H04L 5/0023* (2013.01); *H04L 5/0094* (2013.01); *H04L 5/0032* (2013.01); *H04L 5/0069* (2013.01); *H04W 16/28* (2013.01); *H04W 72/51* (2023.01); *H04W 76/14* (2018.02)

(58) Field of Classification Search
CPC ... H04L 5/0048; H04L 5/0023; H04L 5/0094; H04W 76/14; H04W 72/51
USPC .......................................................... 455/450
See application file for complete search history.

(56) References Cited

U.S. PATENT DOCUMENTS

| | | |
|---|---|---|
| 9,319,124 B2 | 4/2016 | Seol et al. |
| 9,319,931 B2 | 4/2016 | Lim et al. |
| 9,781,731 B2 | 10/2017 | Chen et al. |
| 9,820,287 B2 | 11/2017 | Fujishiro et al. |

(Continued)

FOREIGN PATENT DOCUMENTS

| | | |
|---|---|---|
| CN | 101689911 A | 3/2010 |
| CN | 101755394 A | 6/2010 |

(Continued)

OTHER PUBLICATIONS

U.S. Appl. No. 15/166,240, filed May 26, 2016.

(Continued)

*Primary Examiner* — Chuck Huynh (74) *Attorney, Agent, or Firm* — Amin, Turocy & Watson, LLP (57) ABSTRACT

Device to device (D2D) communication control is provided. A method comprises: allocating a pilot channel resource for at least one directional pilot signal associated with directional D2D communication; and sending information associated with the pilot channel resource. A respective pilot (Continued)

S220 — Receive information associated with a pilot channel resource of at least one directional pilot signal associated with directional D2D communication S240 — Send at least one directional pilot signal at least according to the information channel resource for a direction pilot signal can be allocated for each direction D2D communication, thereby providing a basis for better control of the D2D communication.

20 Claims, 6 Drawing Sheets

(56) References Cited

U.S. PATENT DOCUMENTS

| | | |
|---|---|---|
| 2007/0082692 A1 | 4/2007 | Tirkkonen et al. |
| 2007/0287384 A1 | 12/2007 | Sadri et al. |
| 2009/0015478 A1 | 1/2009 | Li et al. |
| 2009/0019150 A1 | 1/2009 | Li et al. |
| 2009/0046653 A1 | 2/2009 | Singh et al. |
| 2011/0103317 A1 | 5/2011 | Ribeiro et al. |
| 2013/0078991 A1 | 3/2013 | Nam |
| 2013/0170387 A1 | 7/2013 | Wang et al. |
| 2013/0208587 A1 | 8/2013 | Bala et al. |
| 2014/0153390 A1 | 6/2014 | Ishii et al. |
| 2014/0219095 A1* | 8/2014 | Lim ............... H04W 76/14 370/235 |
| 2014/0235287 A1 | 8/2014 | Maltsev et al. |
| 2014/0274088 A1 | 9/2014 | Talwar et al. |
| 2014/0321367 A1 | 10/2014 | Marupaduga et al. |
| 2015/0049736 A1 | 2/2015 | Liu et al. |
| 2015/0119088 A1 | 4/2015 | Lee et al. |
| 2015/0222345 A1 | 8/2015 | Chapman et al. |
| 2015/0288427 A1 | 10/2015 | Wang et al. |
| 2015/0373730 A1* | 12/2015 | Fujishiro ............... H04W 28/06 455/450 |
| 2015/0382290 A1 | 12/2015 | Yaacoub |
| 2016/0183286 A1 | 6/2016 | Park et al. |
| 2016/0270106 A1 | 9/2016 | Zhou et al. |
| 2016/0352484 A1 | 12/2016 | Wei et al. |
| 2016/0352485 A1 | 12/2016 | Wei et al. |
| 2017/0041974 A1 | 2/2017 | Liao et al. |

FOREIGN PATENT DOCUMENTS

| | | |
|---|---|---|
| CN | 102598844 A | 7/2012 |
| CN | 102833691 A | 12/2012 |
| CN | 103081380 A | 5/2013 |
| CN | 103716776 A | 4/2014 |
| CN | 103718514 A | 4/2014 |
| CN | 104113832 A | 10/2014 |
| CN | 104113851 A | 10/2014 |
| CN | 104244392 A | 12/2014 |
| CN | 104270712 A | 1/2015 |
| CN | 104284407 A | 1/2015 |
| CN | 104301984 A | 1/2015 |
| CN | 104488332 A | 4/2015 |
| WO | 2015/005745 A1 | 1/2015 |

OTHER PUBLICATIONS

Fodor, et al. "A Distributed Power Control Scheme for Cellular Network Assisted D2D Communications", 2011 IEEE Global Telecommunications Conference (Globecom 2011). Dec. 2011. 6 pages.

Yu, et al. "On the Performance of Device-to-Device Underlay Communication with Simple Power Control", IEEE 69th Vehicular Technology Conference, 2009. VTC Spring 2009. Apr. 2009. 5 pages.

Xing, et al. "The investigation of power control schemes for a device-to-device communication integrated into OFDMA cellular system", 2010 IEEE 21st International Symposium on Personal, Indoor and Mobile Radio Communications, Sep. 2010. 6 pages.

Office Action dated Oct. 6, 2017 for U.S. Appl. No. 15/167,809, 23 pages.

Office Action dated Jan. 18, 2018 for U.S. Appl. No. 15/166,229, 34 pages.

Office Action dated Mar. 8, 2018 for U.S. Appl. No. 15/166,240, 24 pages.

Office Action dated Apr. 6, 2018 for U.S. Appl. No. 15/166,257, 44 pages.

Office Action dated May 31, 2018 for U.S. Appl. No. 15/166,229, 31 pages.

Office Action dated May 25, 2018 for U.S. Appl. No. 15/166,252, 48 pages.

Office Action dated May 10, 2018 for U.S. Appl. No. 15/167,809, 18 pages.

Office Action dated Oct. 11, 2018 for U.S. Appl. No. 15/166,240, 27 pages.

Office Action dated Oct. 23, 2018 for U.S. Appl. No. 15/166,252, 24 pages.

Notice of Allowance dated Sep. 24, 2018 for U.S. Appl. No. 15/166,229, 25 pages.

Office Action dated Jan. 2, 2019 for U.S. Appl. No. 15/166,257, 43 pages.

Chinese Office Action for Chinese Application Serial No. 201510289747.8 dated Feb. 11, 2019, 6 pages.

Chinese Office Action for Chinese Application Serial No. 201510288695.2 dated Feb. 3, 2019, 6 pages.

Chinese Office Action for Chinese Application Serial No. 201510288807.4 dated Feb. 3, 2019, 7 pages.

Office Action dated Mar. 8, 2019 for U.S. Appl. No. 15/166,240, 20 pages.

Office Action dated Jun. 27, 2019 for U.S. Appl. No. 15/166,240, 25 pages.

Non-Final Office Action received for U.S. Appl. No. 15/166,240 dated Jan. 8, 2020, 27 pages.

Final Office Action received for U.S. Appl. No. 15/166,240 dated Jul. 9, 2020, 51 pages.

* cited by examiner

D2D COMMUNICATION CONTROL METHOD AND CONTROL APPARATUS

RELATED APPLICATIONS

The subject patent application is a divisional of, and claims priority to each of, U.S. patent application Ser. No. 15/166,240 (now U.S. patent Ser. No. 11/012,205), filed May 26, 2016, and entitled "D2D COMMUNICATION CONTROL METHOD AND CONTROL APPARATUS," which applications claim priority to Chinese Patent Application No. 201510289747.8, filed with the Chinese Patent Office on May 29, 2015, and entitled "D2D COMMUNICATION CONTROL METHOD AND CONTROL APPARATUS", the entireties of which applications are hereby incorporated by reference herein.

TECHNICAL FIELD

Embodiments of the present application relate to the field of device to device (D2D) communication technologies, and, for example, to a D2D communication control method and control apparatus.

BACKGROUND

D2D technologies allow direct communication between terminal devices, and therefore, frequency spectrum efficiency of a cellular communication system may be effectively improved, transmit power of a terminal is reduced, and a problem of lack of frequency spectrum resources of a wireless communication system may be solved to some extent. The D2D mode has been accepted by the 3GPP standards organizations, is applied to a long term evolution (LTE) communication system, and has a very broad application prospect.

SUMMARY

In view of this, one example, non-limiting object of one or more example embodiments of the present application is to provide a D2D communication control solution that can help to better implement D2D communication.

A first aspect of example embodiments of the present application provides a D2D control method, comprising:
    allocating a pilot channel resource for at least one directional pilot signal associated with directional D2D communication; and
    sending information associated with the pilot channel resource.

In a second aspect, an example embodiment of the present application provides a D2D communication control method, and the method comprises:
    receiving information associated with a pilot channel resource for at least one directional pilot signal associated with directional D2D communication; and
    sending at least one directional pilot signal at least according to the information.

In a third aspect, an example embodiment of the present application provides a D2D communication control apparatus, and the apparatus comprises:
    an allocation module, configured to allocate a pilot channel resource for at least one directional pilot signal associated with directional D2D communication; and
    a first sending module, configured to send information associated with the pilot channel resource.

In a fourth aspect, an example embodiment of the present application provides a D2D communication control apparatus, and the apparatus comprises:
    a second reception module, configured to receive information associated with a pilot channel resource for at least one directional pilot signal associated with directional D2D communication; and
    a second sending module, configured to send at least one directional pilot signal at least according to the information.

In a fifth aspect, an example embodiment of the present application provides a computer readable storage device, comprising at least one executable instruction, which, in response to execution, causes a system comprising a processor to perform operations, comprising:
    allocating a pilot channel resource for at least one directional pilot signal associated with directional D2D communication; and
    sending information associated with the pilot channel resource.

In a sixth aspect, an example embodiment of the present application provides a device for device to device (D2D) communication control comprising a processor and memory, wherein the memory storing a computer executable instruction, the processor being connected with the memory via a communication bus, and when the device is operating, the processor executes or facilitates execution of the executable instructions stored by the memory:
    allocating a pilot channel resource for at least one directional pilot signal associated with directional D2D communication; and
    sending information associated with the pilot channel resource.

In a seventh aspect, an example embodiment of the present application provides a computer readable storage device, comprising at least one executable instruction, which, in response to execution, causes a system comprising a processor to perform operations, comprising:
    receiving information associated with a pilot channel resource for at least one directional pilot signal associated with directional D2D communication; and
    sending at least one directional pilot signal at least according to the information.

In an eighth aspect, an example embodiment of the present application provides a device for device to device (D2D) communication control comprising a processor and memory, wherein the memory storing a computer executable instruction, the processor being connected with the memory via a communication bus, and when the device is operating, the processor executes or facilitates execution of the executable instructions stored by the memory:
    receiving information associated with a pilot channel resource for at least one directional pilot signal associated with directional D2D communication; and
    sending at least one directional pilot signal at least according to the information.

The methods and apparatuses of the embodiments of the present application allocate a respective pilot channel resource for a direction pilot signal for each direction D2D communication, thereby providing a basis for better control of the D2D communication.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

Example embodiments of the present application are further described in detail through accompanying drawings and embodiments. The following embodiments are used to describe the present application, but are not intended to limit the scope of the present application.

Persons skilled in the art should understand that terms such as "first" and "second" in the present application are merely used to distinguish different devices, modules, parameters or the like, and the terms neither represent any specific technical meanings nor indicate necessary logic orders of them.

In example embodiments of the present application, the term "directional device to device (D2D) communication" refers to D2D communication performing directional transmission over a D2D communication link. The "directional transmission" refers to transmission of a radio frequency signal in a specific direction (also referred to as directed transmission) implemented with one or more directional transmitting antennas, and comprises: transmission in a specific sector direction, or transmission to one receiving end through multiple paths (for example, directional transmit implemented by conducting beam forming with a smart antenna technique).

In a D2D communication under partial cellular networks coverage application scenario, in the case where a D2D communication device uses a dedicated channel, communication in the cellular network will not be interfered. However, when the density of users in a cell is high, the D2D communication will share or reuse frequency resources of cellular users. When the D2D communication and cellular communication reuse the same wireless resource, mutual interference will occur. Along with development of intelligentization of terminals, more and more terminal devices start to have the directional transmission capability, for example, a terminal implements directional transmission in a manner of beam forming by being provided with a smart antenna. The directional transmission can form spatial separation of a D2D signal from an uplink signal of a co-frequency cellular user (a cellular user reusing a frequency the same as that of a D2D user to transmit signal), thereby reducing interference between a D2D user and the co-frequency cellular user. Appropriate control is implemented for possible directional D2D transmission, so as to reduce interference of a D2D user to a co-frequency cellular user, thereby implementing improvement of the overall throughput of the system. The embodiments of the present application provides, based on the possible directional D2D transmission, a D2D communication control solution for helping better implementation of the D2D communication.

A pilot signal is a known signal provided by a sender device to a receiver device and used for channel estimation or channel detection. In the embodiments of the present application, for the possible directional D2D transmission, each device (preferably, a sender device) in both parties of communication involved in the directional D2D communication is enabled to send an uplink directional pilot signal, so as to provide basis for better D2D communication control according to the directional pilot signal associated with the directional D2D communication.

Figure 1:
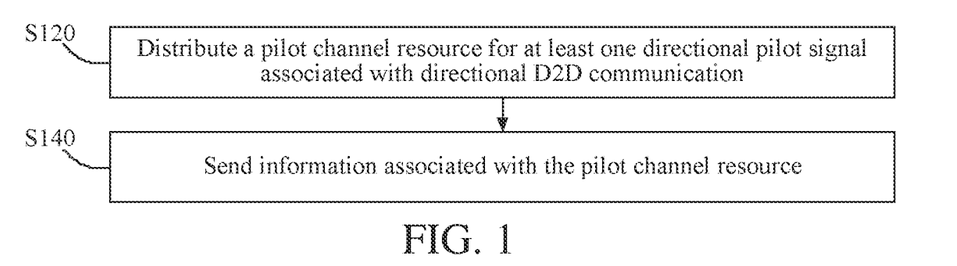
FIG. 1 is an example schematic flow chart of an example of a D2D communication control method according to a first embodiment of the present application.

FIG. 1 is a flow chart of a D2D communication control method according to an embodiment of the present application. The method may be executed by a base station, and may also be executed by an independent apparatus (optionally, an independent apparatus at the base station side). As shown in FIG. 1, the method comprises:

S120: Allocate a pilot channel resource for at least one directional pilot signal associated with directional D2D communication.

As described in the foregoing, the directional pilot signal refers to a pilot signal transmitting in a specific direction, implemented by means of one or more directional transmitting antennas, and the direction of the directional pilot signal is the same as the possible direction of the corresponding D2D communication, that is, the same as the possible direction of sending a data signal between both parties of communication involved in the directional D2D communication. The direction related to the to-be-implemented directional D2D communication may be already determined and unique, for example, uniquely determined by a sender device according to a position of a receiver device, and in this case, the direction of the corresponding directional pilot signal is also unique; the to-be-implemented directional D2D communication may further have two or more expected candidate directions, an appropriate direction is then determined according to communication performances, interference conditions and the like of each candidate direction, and correspondingly, each expected candidate direction also has a corresponding directional pilot signal. In other words, the at least one directional pilot signal comprises: at least one pilot signal in one direction, or at least one pilot signal in each direction when there are multiple directions. To better implement the directional D2D communication, the method of this embodiment allocates a specific pilot channel resource for the directional D2D communication. In an example embodiment, directed to each to-be-implemented directional D2D communication, for different intended uses of directional pilot signals (such as, interference measurement and the selection about direction), one or more pilot channel resources used to send one or more directional pilot signals may be allocated. The one or more pilot channel resources may be channel resources that have been occupied by other cellular users, may be channel resources that are occupied by directional D2D communications in other directions, and may also be idle channel resources that have not been occupied by any user.

S140: Send information associated with the pilot channel resource.

After the pilot channel resource of at least one directional pilot signal allocated for each directional D2D communication is determined, information association with the allocation is sent, for a user side or another base station side to listen a pilot signal in the allocated channel resource.

In view of the foregoing, the method of this embodiment allocates, directed to possible directional D2D transmission, a respective directional pilot channel resource for each directional D2D communication, for sending a directional pilot signal, thereby providing a basis for better control of the D2D communication.

In an example embodiment, the allocation of the pilot channel resource in step S120 may be triggered in response to determining to establish a communication link for each directional D2D communication (also referred to as a directional D2D communication link in the following). The determining to establish the communication link may comprise: an execution apparatus of the method of this embodiment actively determines that a directional D2D communication link can be established, and establishes or controls to establish the directional D2D communication link. Or, the execution apparatus of the method of this embodiment may respond to a D2D communication requirement between user equipments, determine whether a directional D2D communication link can be established between the involved user equipments, and establish or control to establish the directional D2D communication link. The establishment of the directional D2D communication link may be implemented by using, for example, an interaction process required by establishment of a communication link and well-known by persons skilled in the art. In an example embodiment in which the execution apparatus of the method of this embodiment actively determines to establish a directional D2D communication link, the method of this embodiment further comprises:

S110: In response to that at least one party in both parties of communication has a directional transmission capability, determine to establish a communication link for the directional D2D communication.

Correspondingly, step S120 may further comprise:

S122: Allocate the pilot channel resource in response to the determining to establish the communication link of the directional D2D communication.

In an example embodiment in which to establish the directional D2D communication link is determined in response to a D2D communication requirement between user equipments, the method of this embodiment further comprises:

S102: Receive request information associated with establishing a communication link of directional D2D communication.

That is, when there is a D2D communication requirement between user equipments, a device of at least one party initiates a request to establish a D2D communication link to a base station of the serving cellular cell, in order to acquire a resource associated with conducting D2D communication.

S104: In response to the received request information, determine a directional transmission capability of at least one party in both parties of communication.

In an example embodiment, the directional transmission capability of a device of any party in both parties of communication may be known, for example, it has been reported to the base station of the cellular cell before, and the execution apparatus of the method of this embodiment may determine, in response to the request information, the directional transmission capability of at least one party in both parties of communication.

In another example embodiment, the directional transmission capability of a device of any party in both parties of communication is unknown, but may be comprised in the request information. For example, the request information clearly indicates that a device of at least one party can conduct directional transmit. As a response, the execution apparatus of the method of this embodiment can determine, according to the request information, that the both parties of communication support directional D2D transmission, thereby determining to establish a D2D communication link using directional transmission between the two parties. In still another example embodiment, the directional transmission capability of a device of any party in both parties of communication is unknown, and the execution apparatus of the method of this embodiment may respond to the received request information, determine, by for example communicating with at least one part in the both parties of communication, whether the both parties of communication support directional D2D transmission, thereby determining whether a directional D2D communication link can be established between the two. In such an example embodiment, the step S104 may further comprise:

S1042: Send a query associated with the directional transmission capability.

S1044: Receive information associated with the directional transmission capability of at least one party in the both parties of communication.

In still another example embodiment, the request information may comprise information associated with using directional transmission over the D2D communication link, and the information indicates that the D2D communication link involves the directional transmission, that is, indirectly indicates that at least one party in the both parties of communication has the directional transmission capability. In such an example embodiment, the step S104 may further comprise:

S1046: In response to that the request information comprises the information associated with using directional transmission over the D2D communication link, determine that at least one party in the both parties of communication has the directional transmission capability.

The information associated with using the directional transmission over the D2D communication link comprises information associated with at least one of the following: a sender device of the D2D communication link will use directional transmit over the D2D communication link, a directional coefficient of the directional transmit, the sender device uses a beam forming technology over the D2D communication link, or any other information that can indicate the D2D communication link involves the directional transmission.

It should be noted that, devices of the both parties of communication corresponding to the determined established directional D2D communication link first should possess the capability of supporting the D2D communication, and the execution body of the method of this embodiment needs to perform confirmation on this before determining to establish the D2D communication link using the directional transmission, and this process is a relatively mature technology in the art, and is not repeated herein.

Moreover, in the method of this embodiment, directed to different control objectives, the allocation condition of the pilot channel resource in step S120 may be informed to devices of multiple parties. In an example embodiment, the allocation condition of the pilot channel resource may be used for a local cellular cell base station involved in each directional D2D communication to conduct control such as interference measurement and resource allocation, and when the execution body of the method of this embodiment is the base station itself, the base station may directly use the allocation condition to monitor a corresponding channel resource. In an example embodiment in which the execution body of the method of this embodiment is independent to the base station, the method of this embodiment informs the base station of the resource allocation condition by communicating with the base station. Moreover, in an example embodiment, step S140 may comprise:

S142: Send the information associated with the pilot channel resource to at least the sender device involved in the directional D2D communication, so that at least the sender device can send at least one directional pilot signal at least according to the allocated pilot channel resource.

In another example embodiment, step S140 may further comprise:

S144: Send the information associated with the pilot channel resource to at least one neighboring cell base station involved in the directional D2D communication. In such an example embodiment, one or more neighboring cell base stations may monitor corresponding channel resources according to the allocation condition of the pilot channel resource, for a possible local cell and/or neighboring cell to conduct interference measurement and the like.

In still another example embodiment, step S140 may further comprise:

S146: Send the information associated with the pilot channel resource to at least one user equipment in a cellular cell involved in the directional D2D communication. In such an example embodiment, the one or more other user equipment may listen corresponding channel resources according to the allocation condition of the pilot channel resource, and may comprise the receiver device involved in the directional D2D communication. The reception condition of the receiver device on the directional pilot signal reflects a reception effect that can be implemented in the corresponding direction, and provides a reference for implementing the control on the directional D2D communication in this aspect.

In view of the foregoing, the method of this embodiment allocates, for directional D2D communication, a pilot channel resource used to send a directional pilot signal, and informs the resource allocation condition to a base station and a user equipment of the serving cell and/or a base station and a user equipment of a neighboring cell, and the like, thereby providing references for implementing the directional D2D communication in many aspects.

Moreover, the method of this embodiment may further comprise:

S162: Determine a pilot configuration of at least one directional pilot signal associated with the directional D2D communication. The pilot configuration relates to the structure of the pilot signal, for example, the pilot signal may comprise information associated with the directivity of the pilot signal, a manner of comprising, and the like.

Similarly, according to different roles of the execution apparatus of the method of this embodiment and functions of the directional pilot signal, the method of this embodiment may further comprise:

S164: Send information associated with the pilot configuration, so that an apparatus receiving the directional pilot signal can parse the received pilot signal according to the pilot configuration.

In view of the foregoing, the method of this embodiment is helpful to better implementation of the directional D2D communication.

Figure 2:
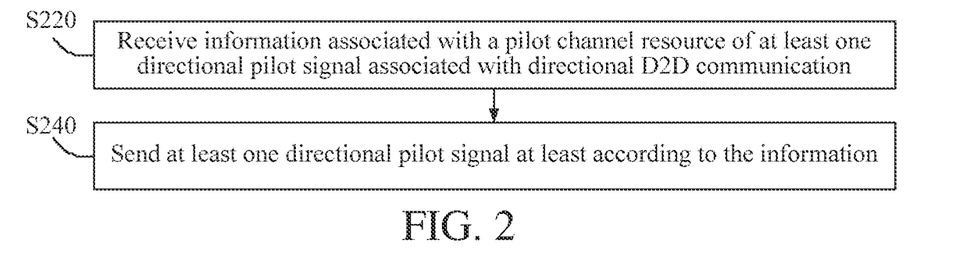
FIG. 2 is an example schematic flow chart of an example of a D2D communication control method according to a second embodiment of the present application.

The present application further provides another D2D communication control method based on the directional pilot signal described in FIG. 1. FIG. 2 is a flow chart of an exemplary D2D communication control method. The method may be executed by a device of any party involved in the directional D2D communication, and may also be executed by an independent apparatus. As shown in FIG. 2, the method comprises:

S220: Receive information associated with a pilot channel resource of at least one directional pilot signal associated with directional D2D communication.

As described with reference to FIG. 1, to better implement the directional D2D communication, technical solutions in the embodiments of the present application employ a directional pilot signal associated with the directional D2D communication. In an example embodiment, directed to each to-be-implemented directional D2D communication, one or more pilot channel resources used to send one or more directional pilot signals may be allocated according to intended uses of the directional pilot signal (such as, interference measurement and directional selection). The one or more pilot channel resources may be channel resources that have been occupied by other cellular users, may be channel resources that are occupied by directional D2D communications in other directions, and may also be idle channel resources that have not been occupied by any user.

S240: Send at least one directional pilot signal at least according to the information, that is, send at least one directional pilot signal on the allocated pilot channel resource. The at least one directional pilot signal comprises: at least one pilot signal in one direction, or at least one pilot signal corresponding to each direction in multiple directions.

In view of the foregoing, the method of this embodiment provides a directional pilot signal involved in directional D2D communication, thereby being capable of more effectively providing a basis for implementing the directional D2D communication.

Still as described in the embodiment with reference to FIG. 1, the allocation of the pilot channel resource may be triggered in response to the establishment of a communication link of each directional D2D communication. The determination to establish the communication link may be: initiated by the base station side; and may also be initiated by sending a D2D communication request to the base station side in response to a D2D communication requirement between user equipments, in order to acquire a resource associated with conducting the D2D communication. In such an example embodiment, the method of this embodiment further comprises:

S210: Send request information associated with establishing the communication link.

Still as described with reference to FIG. 1, establishing the communication link is determined in response to that at least one party in both parties of communication has the directional transmission capability. In an example embodiment, the execution apparatus of the method of this embodiment may comprise the information associated with the directional transmission capability of the device of at least one party in the both parties of communication in the request information, for example, it is clearly indicated in the request information that the device of at least one party can conduct directional transmit, so that the base station side can determine, according to the request information, that the both parties of communication support the directional D2D transmission, thereby determining that the directional D2D communication link can be established. In another example embodiment, in response to a query of the base station side, the directional transmission capability of the device of any party in both parties of communication may be reported to the base station side. In such an example embodiment, the method of this embodiment further comprises:

S232: Receive a query associated with the directional transmission capability of at least one party in both parties of communication.

S234: Send information associated with the directional transmission capability of at least one party in both parties of communication.

In still another example embodiment, the execution apparatus of the method of the embodiment of the present application may comprise information associated with using directional transmission on the D2D communication link in the request information, and the information indicates that the D2D communication link involves the directional transmission, that is, indirectly indicates that at least one party in the both parties of communication has the directional transmission capability.

The information associated with using the directional transmission over the D2D communication link comprises information associated with at least one of the following: a sender device of the D2D communication link will use directional transmit over the D2D communication link, a directional coefficient of the directional transmit, the sender device uses a beam forming technology over the D2D communication link, or any other information that can indicate the D2D communication link involves the directional transmission.

It should be noted that, the both parties implementing the directional D2D transmission first should have the capability of supporting the D2D communication, the execution apparatus of the method of this embodiment will respond to this when the base station side confirms this, and this process is a relatively mature technology in the art, which is not repeated herein.

In view of the foregoing, the method of this embodiment is helpful to better implementation of the D2D communication.

A person skilled in the art should understand that in the above method of the example embodiment of the present application, serial numbers of steps do not indicate priorities of execution sequences, the execution sequences of the steps should be determined according to functions and inner logic thereof, and should not constitute a limitation to implementation processes of the example embodiment of the present application.

In addition, an embodiment of the present application further provides a computer readable medium, comprising computer readable instructions for performing the following operations when being executed: executing operations of the steps in the method in the example embodiment shown in FIG. 1.

In addition, an embodiment of the present application further provides a computer readable medium, comprising computer readable instructions for performing the following operations when being executed: executing operations of the steps in the method in the example embodiment shown in FIG. 2.

Figure 3A:
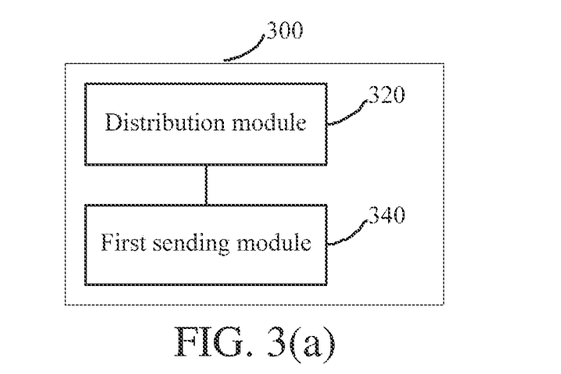
FIG. 3(a) to FIG. 3(e) are example schematic structural diagrams of various examples of a D2D communication control apparatus according to a first embodiment of the present application.

An embodiment further provides an apparatus executing the D2D communication control method. The apparatus may be an independent apparatus, and may also be an apparatus belonging to a base station. According to requirements of different execution roles of the apparatus, in addition various components described in the following, the apparatus may further comprise a communication module that may implement communication with any device external to the apparatus as required. As shown in FIG. 3(a), a D2D communication power control apparatus 300 of the embodiment of the present application comprises: an allocation module 320 and a first sending module 340.

The allocation module 320 is configured to allocate a pilot channel resource for at least one directional pilot signal associated with directional D2D communication.

As described in the foregoing, the directional pilot signal refers to a pilot signal transmitting in a specific direction, implemented by means of one or more directional transmitting antennas, and the direction of the directional pilot signal is the same as the possible direction of the corresponding D2D communication, that is, the same as the possible direction of sending a data signal between both parties of communication involved in the directional D2D communication. The direction related to the to-be-implemented directional D2D communication may be already determined and unique, for example, uniquely determine d by a sender device according to a position of a receiver device, and in this case, the direction of the corresponding directional pilot signal is also unique; the to-be-implemented directional D2D communication may further have two or more expected candidate directions, an appropriate direction is then determined according to communication performances, interference conditions and the like of each candidate direction, and correspondingly, each expected candidate direction also has a corresponding directional pilot signal. In other words, the at least one directional pilot signal comprises: at least one pilot signal in one direction, or at least one pilot signal in each direction when there are multiple directions. To better implement the directional D2D communication, the apparatus 300 of this embodiment allocates a specific pilot channel resource for the directional D2D communication. In an example embodiment, directed to each to-be-implemented directional D2D communication, for different intended uses of directional pilot signals (such as, interference measurement and the selection about direction), one or more pilot channel resources used to send one or more directional pilot signals may be allocated. The one or more pilot channel resources may be channel resources that have been occupied by other cellular users, may be channel resources that are occupied by directional D2D communications in other directions, and may also be idle channel resources that have not been occupied by any user.

The first sending module 340 is configured to send information associated with the pilot channel resource.

After the pilot channel resource of at least one directional pilot signal allocated for each directional D2D communication is determined, information association with the allocation is sent, for a user side or another base station side to listen a pilot signal on the allocated channel resource.

In view of the foregoing, the apparatus of this embodiment allocates, directed to possible directional D2D transmission, a respective corresponding directional pilot channel resource for each directional D2D communication, for sending a directional pilot signal, thereby providing a basis for better control of the D2D communication.

Figure 3B:
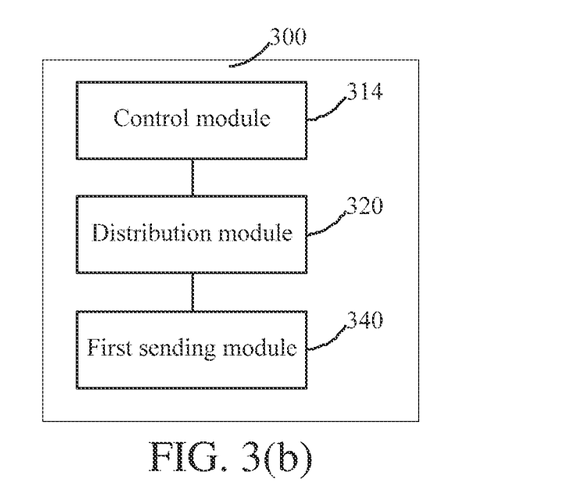

In an example embodiment, the allocation of the pilot channel resource of the allocation module 320 may be triggered in response to determining to establish a communication link for each directional D2D communication (also referred to as a directional D2D communication link in the following). The determining to establish the communication link may comprise: the apparatus 300 of this embodiment actively determines that a directional D2D communication link can be established, and establishes or controls to establish the directional D2D communication link. Or, the apparatus 300 of this embodiment may respond to a D2D communication requirement between user equipments, determine whether a directional D2D communication link can be established between the involved user equipments, and establish or control to establish the directional D2D communication link. The establishment of the directional D2D communication link may be implemented by using, for example, an interaction process required by establishment of a communication link and well-known by persons skilled in the art. In such an example embodiment, as shown in FIG. 3(b), the apparatus 300 of this embodiment may further comprise:

a control module 310, configured to: in response to that at least one party in both parties of communication has a directional transmission capability, determine to establish a communication link for the directional D2D communication.

Correspondingly, the allocation module 320 may allocate the pilot channel resource in response to the determination of establishing the communication link for the directional D2D communication.

Figure 3C:
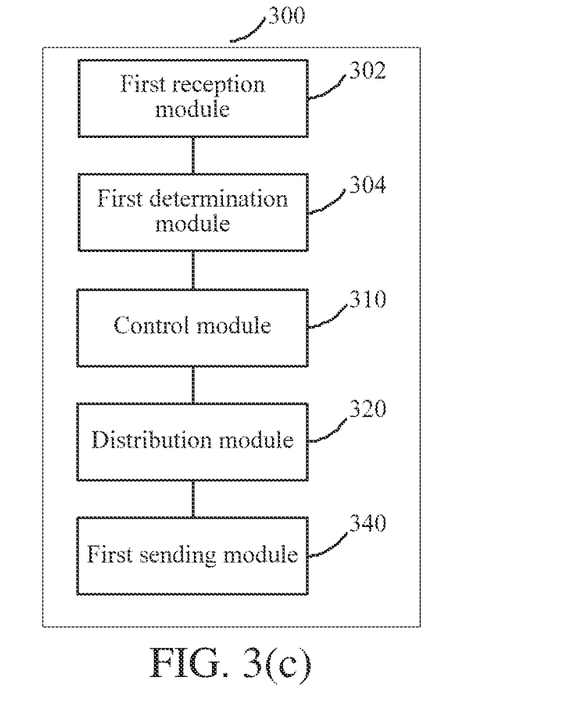

In an example embodiment in which establishment of the directional D2D communication link is determined in response to a D2D communication requirement between user equipments, as shown in FIG. 3(c), the apparatus 300 of this embodiment further comprises: a first reception module 302 and a first determination module 304.

The first reception module 302 is configured to receive request information associated with establishing a communication link of directional D2D communication.

That is, when there is a D2D communication requirement between user equipments, a device of at least one party initiates a request to establish a D2D communication link to a base station of the serving cellular cell, in order to acquire a resource associated with conducting D2D communication.

The first determination module 304 is configured to: in response to the received request information, determine a directional transmission capability of at least one party in both parties of communication.

In an example embodiment, the directional transmission capability of a device of any party in both parties of the communication may be known, for example, it has been reported to the base station of the cellular cell before, and the apparatus 300 of this embodiment may determine, in response to the request information, the directional transmission capability of at least one party of both parties of the communication.

Figure 3D:
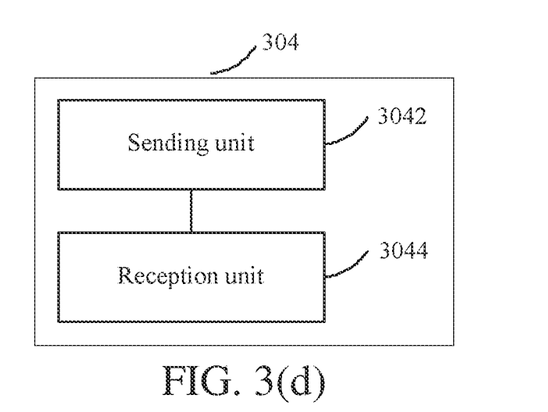

In another example embodiment, the directional transmission capability of a device of any party in both parties of communication is unknown, but may be comprised in the request information. For example, the request information clearly indicates that a device of at least one party can conduct directional transmit. As a response, the apparatus 300 of this embodiment can determine, according to the request information, that the both parties of communication support directional D2D transmission, thereby determining to establish a D2D communication link using directional transmission between the two parties. In still another example embodiment, the directional transmission capability of a device of any party in both parties of communication is unknown, and the apparatus 300 of this embodiment may respond to the received request information, determine, by for example communicating with at least one part in the both parties of communication, whether the both parties of communication support directional D2D transmission, thereby determining whether a directional D2D communication link can be established between the two. In such an example embodiment, as shown in FIG. 3(d), the first determination module 304 may further comprise: a sending unit 3042 and a reception unit 3044.

The sending unit 3042 is configured to send a query associated with the directional transmission capability.

The reception unit 3044 is configured to receive information associated with the directional transmission capability of at least one party in both parties of communication.

In still another example embodiment, the request information may comprise information associated with using directional transmission over the D2D communication link, and the information indicates that the D2D communication link involves the directional transmission, that is, indirectly indicates that at least one party in both parties of communication has the directional transmission capability. In such an example embodiment, the first determination module 304 may, in response to that the request information comprises the information associated with using directional transmission on the D2D communication link, determine that at least one party in both parties of communication has the directional transmission capability.

The information associated with using the directional transmission over the D2D communication link comprises information associated with at least one of the following: a sender device in of the D2D communication link will use directional transmit over the D2D communication link, a directional coefficient of the directional transmit, the sender device uses a beam forming technology over the D2D communication link, or any other information that can indicate the D2D communication link involves the directional transmission.

It should be noted that, devices of the both parties of communication corresponding to the determined established directional D2D communication link first should possess the capability of supporting the D2D communication, and the apparatus 300 of this embodiment needs to perform confirmation on this before determining to establish the D2D communication link using the directional transmission, and this process is a relatively mature technology in the art, and is not repeated herein.

Moreover, in the apparatus of this embodiment, directed to different control objectives, the allocation module 320 may inform devices of multiple parties of the allocation condition of the pilot channel resource. In an example embodiment, the allocation condition of the pilot channel resource may be used for a local cellular cell base station involved in each directional D2D communication to conduct control such as interference measurement and resource allocation, and when the apparatus of this embodiment belongs to the base station itself, it may directly use the allocation condition to monitor a corresponding channel resource. In an implementation manner in which the apparatus 300 of this embodiment is independent to the base station, the apparatus 300 of this embodiment informs the base station of the resource allocation condition by communicating with the base station. Moreover, in an example embodiment, the first sending module 340 may send the information associated with the pilot channel resource to at least the sender device involved in the directional D2D communication, so that at least the sender device can send at least one directional pilot signal at least according to the allocated pilot channel resource.

In another example embodiment, the first sending module 340 may further send the information associated with the pilot channel resource to at least one neighboring cell base station involved in the directional D2D communication. In such an example embodiment, one or more neighboring cell base stations may monitor corresponding channel resources according to the allocation condition of the pilot channel resource, for a possible local cell and/or neighboring cell to conduct interference measurement and the like.

In still another example embodiment, the first sending module 340 may further send the information associated with the pilot channel resource to at least one user equipment in a cellular cell involved in the directional D2D communication. In such an example embodiment, the one or more other user equipment may listen corresponding channel resources according to the allocation condition of the pilot channel resource, and may comprise the receiver device involved in the directional D2D communication. The reception condition of the receiver device on the directional pilot signal reflects a reception effect that can be implemented in the corresponding direction, and provides a reference of implementing the control on the directional D2D communication in this aspect.

In view of the foregoing, the apparatus of this embodiment allocates, for directional D2D communication, a pilot channel resource used to send a directional pilot signal, and informs the resource allocation condition to a base station and a user equipment of the serving cell and/or a base station and a user equipment of a neighboring cell, and the like, thereby providing references for implementing the directional D2D communication in many aspects.

Figure 3E:
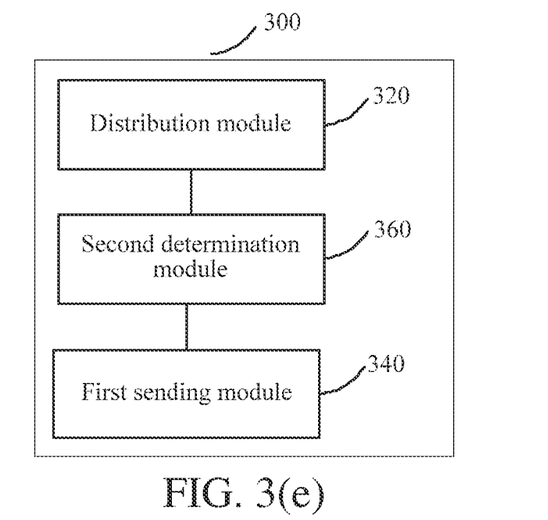

Moreover, as shown in FIG. 3(e), the apparatus 300 of this embodiment may further comprise:

a second determination module 360, configured to determine a pilot configuration of at least one directional pilot signal associated with the directional D2D communication. The pilot configuration relates to the structure of the pilot signal, for example, the pilot signal may comprise information associated with the directivity of the pilot signal, a manner of comprising, and the like.

Similarly, according to different roles of the apparatus of this embodiment and functions of the directional pilot signal, the first sending module 340 may further be configured to send information associated with the pilot configuration, so that an apparatus receiving the directional pilot signal can parse the received pilot signal according to the pilot configuration.

In view of the foregoing, the apparatus of this embodiment is helpful to better implementation of the directional D2D communication.

Figure 4A:
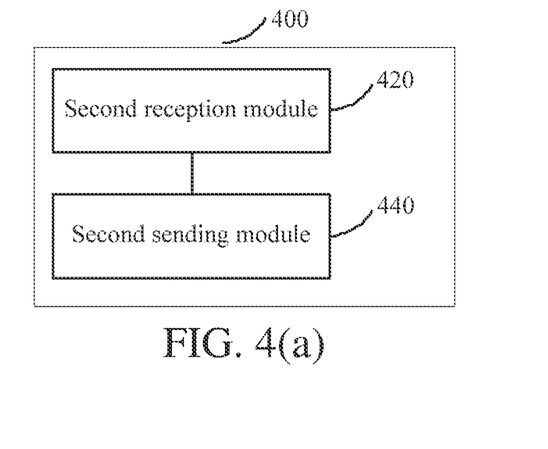
FIG. 4(a) to FIG. 4(c) are example schematic structural diagrams of various examples of a D2D communication control apparatus according to a second embodiment of the present application.

The present application further provides another D2D communication control apparatus based on the directional pilot signal described in FIG. 1. FIG. 4(a) is a structural diagram of an exemplary D2D communication control apparatus. The apparatus may belong to a device of any party involved in the directional D2D communication, and may also be an independent apparatus. As shown in FIG. 4(a), the apparatus 400 comprises: a second reception module 420 and a second sending module 420.

The second reception module is configured to receive information associated with a pilot channel resource for at least one directional pilot signal associated with directional D2D communication.

As described with reference to FIG. 1, to better implement the directional D2D communication, technical solutions in the embodiments of the present application employ a directional pilot signal associated with the directional D2D communication. In an example embodiment, directed to each to-be-implemented directional D2D communication, one or more pilot channel resources used to send one or more directional pilot signals may be allocated according to intended uses of the directional pilot signal (such as, interference measurement and directional selection). The one or more pilot channel resources may be channel resources that have been occupied by other cellular users, may be channel resources that are occupied by directional D2D communications in other directions, and may also be idle channel resources that have not been occupied by any user.

The second sending module 420 is configured to send at least one directional pilot signal at least according to the information, that is, send at least one directional pilot signal on the allocated pilot channel resource. The at least one directional pilot signal comprises: at least one pilot signal in one direction, or at least one pilot signal corresponding to each direction in multiple directions.

In view of the foregoing, the method of this embodiment provides a directional pilot signal associated with the directional D2D communication, thereby being capable of more effectively providing a basis for implementing the directional D2D communication.

Figure 4B:
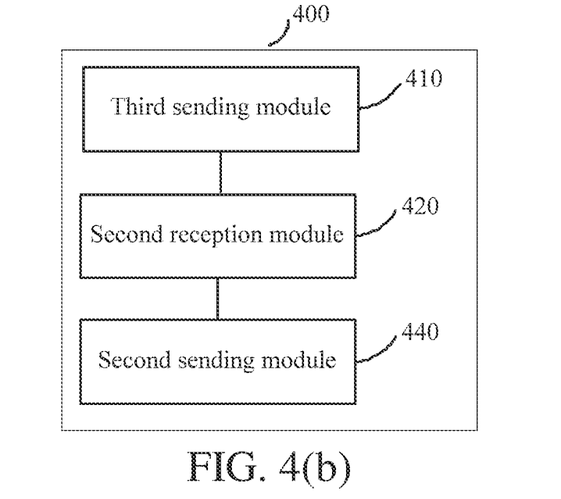

Still as described with reference to FIG. 1, the allocation of the pilot channel resource may be triggered in response to the establishment of a communication link of each directional D2D communication. The determination to establish the communication link may be: initiated by the base station side; and may also be initiated by sending a D2D communication request to the base station side in response to a D2D communication requirement between user equipments, in order to acquire a resource associated with conducting the D2D communication. In such an example embodiment, as shown in FIG. 4(b), the apparatus 400 of this embodiment may further comprise:

a third sending module 410, configured to send request information associated with establishing the communication link.

Figure 4C:
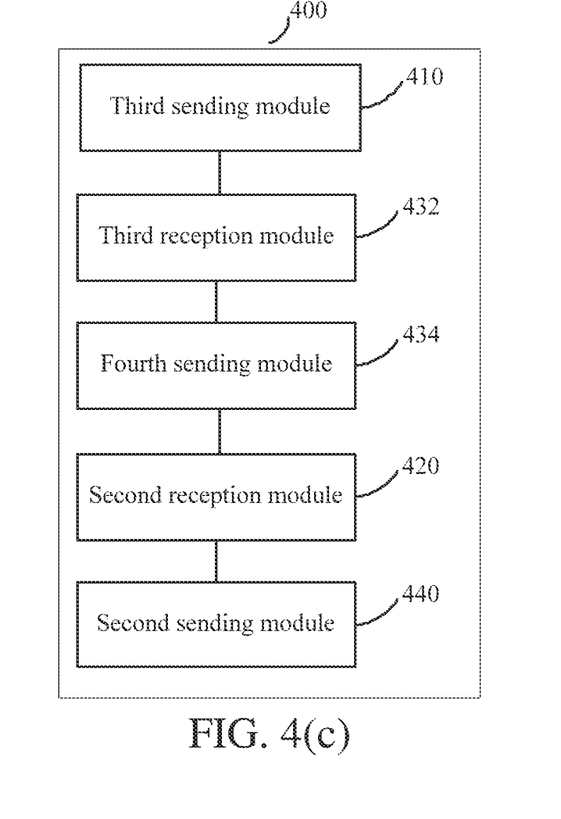

Still as described with reference to FIG. 1, establishing the communication link is determined in response to that at least one party in both parties of communication has the directional transmission capability. In an example embodiment, the apparatus of this embodiment may comprise the information associated with the directional transmission capability of the device of at least one party in the both parties of communication in the request information, for example, it is clearly indicated in the request information that the device of at least one party can conduct directional transmit, so that the base station side can determine, according to the request information, that the both parties of communication support the directional D2D transmission, thereby determining that the directional D2D communication link can be established. In another example embodiment, in response to a query of the base station side, the directional transmission capability of the device of any party in both parties of communication may be reported to the base station side. In such an example embodiment, as shown in FIG. 4(c), the apparatus 400 of this embodiment may further comprise: a third reception module 432 and a fourth sending module 434.

The third reception module 432 is configured to receive a query associated with the directional transmission capability of at least one party of the both parties of the communication.

The fourth sending module 434 is configured to send information associated with the directional transmission capability of at least one party of the both parties of the communication.

In still another example embodiment, the apparatus of the embodiment of the present application may comprise information associated with using directional transmission on the D2D communication link in the request information, and the information indicates that the D2D communication link involves the directional transmission, that is, indirectly indicates that at least one party in the both parties of communication has the directional transmission capability.

The information associated with using the directional transmission over the D2D communication link comprises information associated with at least one of the following: a sender device in of the D2D communication link will use directional transmit over the D2D communication link, a directional coefficient of the directional transmit, the sender device uses a beam forming technology over the D2D communication link, or any other information that can indicate the D2D communication link involves the directional transmission.

It should be noted that, the both parties implementing the directional D2D transmission first should have the capability of supporting the D2D communication, the apparatus of this embodiment will respond to this when the base station side confirms this, and this process is a relatively mature technology in the art, which is not repeated herein.

In view of the foregoing, the apparatus of this embodiment is helpful to better implementation of the D2D communication.

Figure 5:
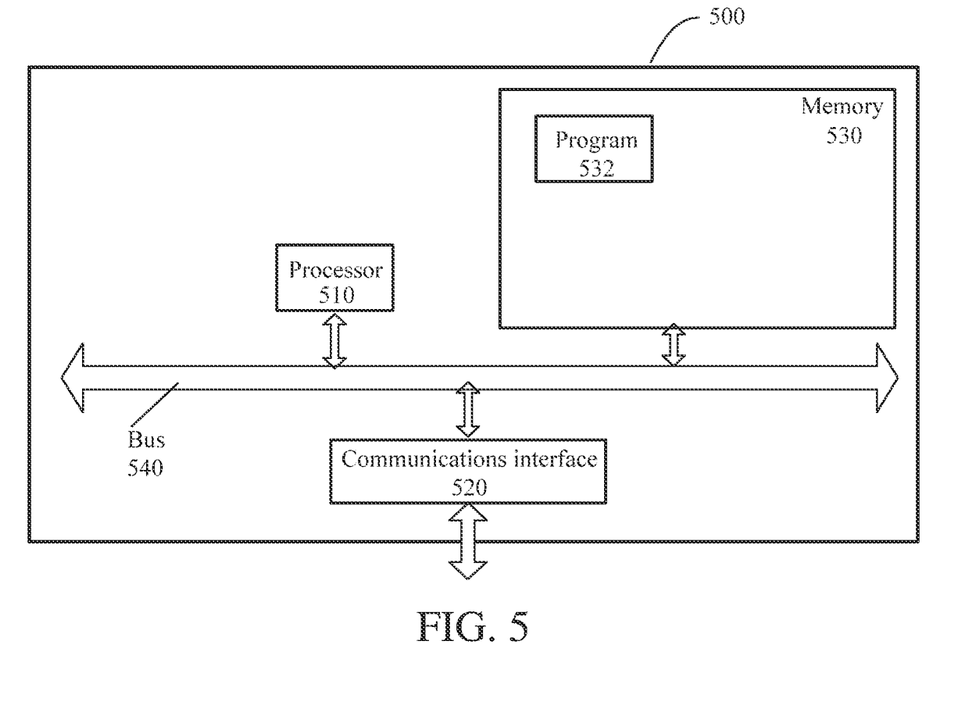
FIG. 5 is an example schematic structural diagram of another example of a D2D communication control apparatus according to the first embodiment of the present application.

FIG. 5 is a schematic structural diagram of a D2D communication control apparatus 500 provided in an embodiment of the present application, and the specific implementation of the D2D communication control apparatus 500 is not limited in the specific implementation of the present application. As shown in FIG. 5, the D2D communication control apparatus 500 may comprise:

A processor 510, a communications interface 520, a memory 530, and a communications bus 540, where:

The processor 510, the communications interface 520, and the memory 530 complete mutual communications with each other through the communications bus 540.

The communications interface 520 is configured to communicate with a network element such as a client.

The processor 510 is configured to execute a program 532, and specifically can implement related functions of the D2D communication control apparatus in the apparatus embodiment of FIG. 3(*a*).

Specifically, the program 532 may comprise a program code. The program code comprises a computer operating instruction.

The processor 510 may be a central processing unit CPU or an Application Specific Integrated Circuit (ASIC), or be configured to be one or more integrated circuits configured to implement the embodiments of the present application. The program 532 may specifically used to cause the D2D communication control apparatus 500 to execute the following steps:

allocating a pilot channel resource for at least one directional pilot signal associated with directional D2D communication; and sending information associated with the pilot channel resource.

Specific implementations of all steps in the program 532 may be referred to in the corresponding descriptions of the corresponding steps or units in the above embodiments, and are not repeated herein. It can be clearly understood by persons skilled in the art that, for the purpose of convenient and brief description, for a detailed working process of the described devices and modules, reference may be made to the corresponding process in the foregoing method embodiment, and the details will not be described herein again.

Figure 6:
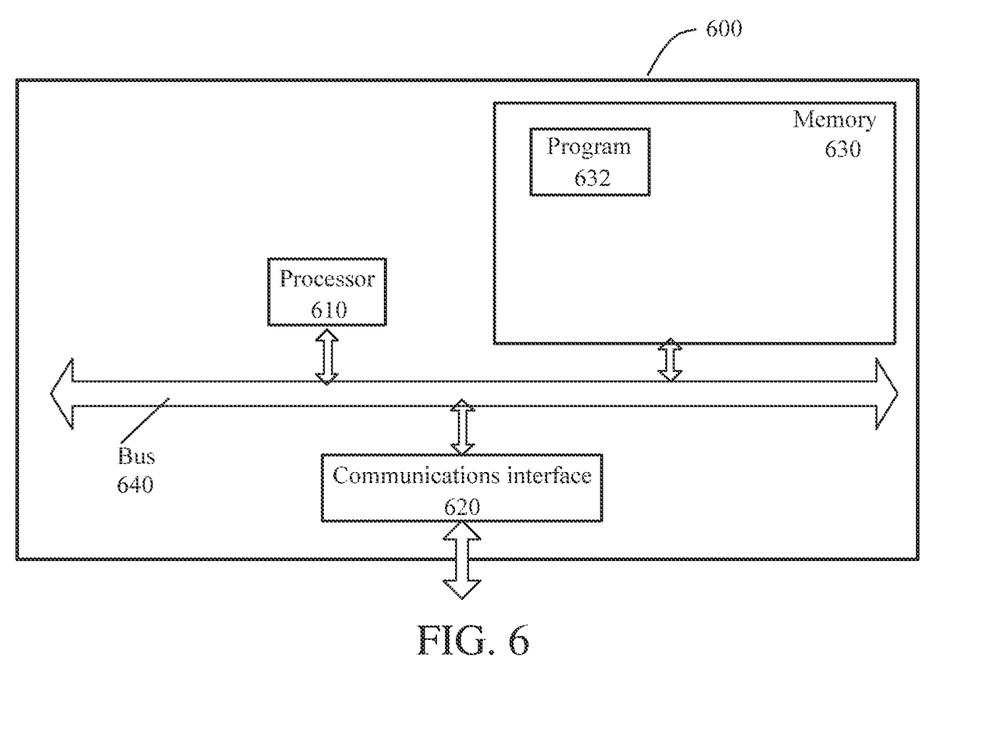
FIG. 6 is an example schematic structural diagram of another example of a D2D communication control apparatus according to the second embodiment of the present application.

FIG. 6 is a schematic structural diagram of a D2D communication control apparatus 600 provided in an embodiment of the present application, and the specific implementation of the D2D communication control apparatus 600 is not limited in the specific implementation of the present application. As shown in FIG. 6, the D2D communication control apparatus 600 may comprise:

A processor 610, a communications interface 620, a memory 630, and a communications bus 640, where:

The processor 610, the communications interface 620, and the memory 630 complete mutual communications with each other through the communications bus 640.

The communications interface 620 is configured to communicate with a network element such as a client.

The processor 610 is configured to execute a program 632, and specifically can implement related functions of the D2D communication control apparatus in the apparatus embodiment of FIG. 4(*a*).

Specifically, the program 632 may comprise a program code. The program code comprises a computer operating instruction.

The processor 610 may be a central processing unit CPU or an Application Specific Integrated Circuit (ASIC), or be configured to be one or more integrated circuits configured to implement the embodiments of the present application. The program 632 may specifically used to cause the D2D communication control apparatus 600 to execute the following steps:

receiving information associated with a pilot channel resource for at least one directional pilot signal associated with directional D2D communication; and sending at least one directional pilot signal at least according to the information.

Specific implementations of all steps in the program 632 may be referred to in the corresponding descriptions of the corresponding steps or units in the above embodiments, and are not repeated herein. It can be clearly understood by persons skilled in the art that, for the purpose of convenient and brief description, for a detailed working process of the described devices and modules, reference may be made to the corresponding process in the foregoing method embodiment, and the details will not be described herein again.

It can be clearly understood by persons skilled in the art that, for the purpose of convenient and brief description, for a detailed working process of the described devices and modules, reference may be made to the corresponding descriptions in the foregoing apparatus embodiment, and the details will not be described herein again.

Although the theme described herein is provided in a general context executed in combination with the operating system and execution of an application on a computer system, a person skilled in the art may know that other implementations may also be executed in combination with other types of program modules. Generally speaking, the program module comprises a routine, a program, a component, a data structure and other types of structures used to execute a specific task or implement a specific abstract data type. A person skilled in the art may understand that, the theme described herein may be implemented by using another computer system configuration, comprising a handheld device, a multi-processor system, a micro-processor based or programmable consumer electronic product, a small-size computer, a large-size computer, and the like, and may also be used in a allocated computing environment in which a task is executed by using remote processing devices connection through a communications network. In the allocated computing environment, the program module may be located in storage devices of both a local memory and a remote memory.

Persons of ordinary skill in the art should appreciate that, in combination with the examples described in the embodiments herein, units and method steps can be implemented by electronic hardware, or a combination of computer software and electronic hardware. Whether the functions are executed by hardware or software depends on specific applications and design constraint conditions of the technical solutions. Persons skilled in the art can use different methods to implement the described functions for every specific application, but it should not be considered that this implementation goes beyond the scope of the present application.

When being implemented in the form of a software functional unit and sold or used as a separate product, the functions may be stored in a computer-readable storage medium. Based on such understanding, example embodiments essentially, or part of the technical solutions may be implemented in a form of a software product. The computer software product is stored in a storage medium, and comprises several instructions for instructing a computer device (which may be a personal computer, a server, a network device, and the like) to execute all or part of the steps of the method described in each of the embodiments of the present application. The computer readable storage medium comprises a physically volatile and non-volatile, mobile, and non-mobile medium that is implemented by any manner or technology for storing information such as a computer readable instruction, a data structure, a program module, or other data. The computer readable storage medium specifically comprises, but is not limited to, a USB disk, a mobile hard disk, a Read-Only Memory (ROM), a Random Access Memory (RAM), an Erasable Programmable Read-Only Memory (EPROM), an electrically Erasable Programmable Read-Only Memory (EEPROM), a flash memory or another solid-state memory technology, a CD-ROM, a digital versatile disc (DVD), an HD-DVD, a Blue-Ray or another optical storage device, a magnetic tape, a magnetic disk storage or another magnetic storage device, or any other medium that can be used to store required information and can be accessed by the computer.

The aforementioned description of the example embodiments are merely provided for describing the present application, but not intended to limit the present application. Persons of ordinary skills in the art can also make many variations and changes without departing from the spirit and the scope of the present application. Therefore, all the equivalent technical solutions also fall within the scope of the present application, and the patent protection scope of the present application shall be limited by the claims.

What is claimed is:

1. A method, comprising:
   receiving, by a system comprising a processor, first information associated with a pilot channel resource for at least one directional pilot signal associated with a directional device to device (D2D) communication, wherein the directional D2D communication refers to D2D communication performing directional transmission over a D2D communication link, and wherein the directional transmission refers to transmission of a radio frequency signal in a specific direction implemented with one or more directional transmitting antennas;
   sending the at least one directional pilot signal at least according to the first information;
   receiving a query associated with a directional transmission capability of at least one party in both parties of a communication using a communication link of the directional D2D communication; and
   sending second information associated with the directional transmission capability of the at least one party.

2. The method of claim 1, further comprising:
   sending request information associated with establishing the communication link of the directional D2D communication.

3. The method of claim 2, wherein the request information comprises: third information associated with another directional transmission capability of at least one other party in both parties of the communication.

4. The method of claim 2, wherein the request information comprises: third information associated with using directional transmission over the communication link.

5. The method of claim 1, wherein the second information comprises an indication that a sender device of the at least one party will use directional transmission over the communication link.

6. The method of claim 1, wherein the second information comprises a directional coefficient of the directional transmission.

7. The method of claim 1, wherein the second information comprises an indication that the sender device uses beam forming over the communication link.

8. The method of claim 1, wherein the first information comprises a pilot configuration of the at least one directional pilot signal.

9. An apparatus, comprising:
   a memory that stores executable modules; and
   a processor, coupled to the memory, that executes or facilitates execution of the executable modules, the executable modules comprising:
   a first reception module configured to receive resource information associated with a pilot channel resource for a directional pilot signal associated with a directional device to device (D2D) communication, wherein the directional D2D communication refers to D2D communication performing directional transmission over a D2D communication link, and wherein the directional transmission refers to transmission of a radio frequency signal in a specific direction implemented with one or more directional transmitting antennas;
   a first sending module configured to send the directional pilot signal at least according to the resource information;
   a second reception module configured to receive a query associated with a directional transmission capability of a party of both parties to a communication using a communication link of the directional D2D communication; and
   a second sending module configured to send capability information associated with the directional transmission capability of the party.

10. The apparatus of claim 9, wherein the executable modules further comprise:
    a third sending module configured to send request information associated with establishing the communication link of the directional D2D communication.

11. The apparatus of claim 10, wherein the request information comprises: third information associated with another directional transmission capability of at least one other party in both parties of the communication.

12. The apparatus of claim 10, wherein the request information comprises: third information associated with using directional transmission over the communication link.

13. The apparatus of claim 9, wherein the capability information associated with the directional transmission capability comprises at least one: a first indication that a sender device of the party will use directional transmission over the communication link, a directional coefficient of the directional transmission, or a second indication that the sender device uses beam forming over the communication link.

14. A non-transitory computer readable medium, comprising at least one executable instruction, which, in response to execution, causes a system comprising a processor to perform operations, comprising:

receiving information associated with a pilot channel resource for a directional pilot signal associated with a directional device to device (D2D) communication, wherein the directional D2D communication refers to D2D communication performing directional transmission over a D2D communication link, and wherein the directional transmission refers to transmission of a radio frequency signal in a specific direction implemented with one or more directional transmitting antennas;

sending the directional pilot signal at least according to the information;

receiving a query associated with a directional transmission capability of at least one party in both parties of a communication using a communication link of the directional D2D communication; and sending second information associated with the directional transmission capability of the at least one party.

15. The non-transitory computer readable medium of claim 14, wherein the operations further comprise:

sending request information associated with establishing the communication link of the directional D2D communication.

16. The non-transitory computer readable medium of claim 15, wherein the request information comprises: third information associated with another directional transmission capability of at least one other party in both parties of the communication.

17. The non-transitory computer readable medium of claim 15, wherein the request information comprises: third information associated with using directional transmission over the communication link.

18. The non-transitory computer readable medium of claim 14, wherein the second information comprises an indication that a sender device of the at least one party will use directional transmission over the communication link.

19. The non-transitory computer readable medium of claim 14, wherein the second information comprises a directional coefficient of the directional transmission.

20. The non-transitory computer readable medium of claim 14, wherein the second information comprises an indication that the sender device uses beam forming over the communication link.

* * * * *